US008458210B2

(12) United States Patent
Arifuddin et al.

(10) Patent No.: US 8,458,210 B2
(45) Date of Patent: Jun. 4, 2013

(54) DATABASE LOAD BALANCING THROUGH DYNAMIC DATABASE ROUTING

(75) Inventors: Syed Arifuddin, Irving, TX (US); Amit Roy, Irving, TX (US); Venugopal Jagannathan, Coppell, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 102 days.

(21) Appl. No.: 13/102,369

(22) Filed: May 6, 2011

(65) Prior Publication Data

US 2012/0284296 A1 Nov. 8, 2012

(51) Int. Cl.
*G06F 17/30* (2006.01)

(52) U.S. Cl.
USPC ............................................ 707/769; 707/770

(58) Field of Classification Search
USPC ................ 707/626–638, 709–712, 781–788, 707/759–770
See application file for complete search history.

(56) References Cited

U.S. PATENT DOCUMENTS

| | | | |
|---|---|---|---|
| 2006/0277596 A1* | 12/2006 | Calvert et al. | 726/3 |
| 2007/0028001 A1* | 2/2007 | Phillips et al. | 709/238 |
| 2007/0203944 A1* | 8/2007 | Batra et al. | 707/104.1 |
| 2009/0075642 A1* | 3/2009 | Rantapuska et al. | 455/422.1 |
| 2010/0031366 A1* | 2/2010 | Knight et al. | 726/26 |
| 2011/0252154 A1* | 10/2011 | Bunch et al. | 709/230 |
| 2012/0185506 A1* | 7/2012 | Gomez Maturana et al. | 707/769 |

* cited by examiner

*Primary Examiner* — Wilson Lee (57) ABSTRACT

A computing cluster may include servers that connect database servers. In one implementation, a server may receive a resource request from a client and extract a session identifier from the resource request. The server may determine, based on the session identifier, one of the database servers to use in fulfilling the resource request.

21 Claims, 6 Drawing Sheets

| ID | SQL INSTANCE | AVAILABLE? |
|---|---|---|
| 1 | FTWP1 | YES |
| 2 | FTWP2 | YES |
| 3 | FTWP3 | NO |
| 4 | FTWP4 | YES |
| 5 | FTWP5 | YES |

410, 412, 414, 416

420-1

| IDVAL | F1 | F2 | ... | FJ |
|---|---|---|---|---|
| 1 | | | | |
| 41 | | | | |
| 81 | | | | |
| 121 | | | | |

422

⋮

420-P

| IDVAL | F1 | F2 | ... | FK |
|---|---|---|---|---|
| 1 | | | | |
| 41 | | | | |
| 81 | | | | |
| 121 | | | | |

Table 430:

| ID | SQL INSTANCE | AVAILABLE? |
|---|---|---|
| 1 | FTWP1 | YES |
| 2 | FTWP2 | YES |
| 3 | FTWP3 | NO |
| 4 | FTWP4 | YES |
| 5 | FTWP5 | YES |

Table 440-1 (442):

| IDVAL | F1 | F2 | ... | FJ |
|---|---|---|---|---|
| 2 | | | | |
| 42 | | | | |
| 82 | | | | |
| 122 | | | | |

⋮

Table 440-P (442):

| IDVAL | F1 | F2 | ... | FK |
|---|---|---|---|---|
| 2 | | | | |
| 42 | | | | |
| 82 | | | | |
| 122 | | | | |

DATABASE LOAD BALANCING THROUGH DYNAMIC DATABASE ROUTING

BACKGROUND

Computing services, such as cloud based services, may be provided by a cluster of one or more physical computing devices. For example, a cloud web server may include one or more load balancing network devices, a number of web servers, and a number of database servers. Requests for web content from the cloud web server may be directed, by the load balancing network devices, to the web servers, which may interact with the database servers to fulfill the requests.

DETAILED DESCRIPTION

The following detailed description refers to the accompanying drawings. The same reference numbers in different drawings may identify the same or similar elements.

When designing a cluster of computing devices to perform a service, two important considerations are availability and load balancing of the cluster. Ideally, the cluster should have a high availability so that failures of one or more devices in the cluster does not significantly affect service to the clients of the cluster. Additionally, to maximize performance of the cluster under heavy usage conditions, it can be important to load balance both the web servers and the database servers in the cluster.

A computing cluster is described herein in which a number of web servers connect to a number of database servers. Session identifiers may be used by the web servers to mark the particular database server that is being used by a web server to handle a particular client. Subsequent requests by a client may be routed, based on the session identifier, to the same database server. Advantageously, the session identifiers may thus be used to ensure that the same database server handles all of the subsequent requests from the client. The session identifiers may be assigned in a manner that provides load balancing between the database servers.

Figure 1:
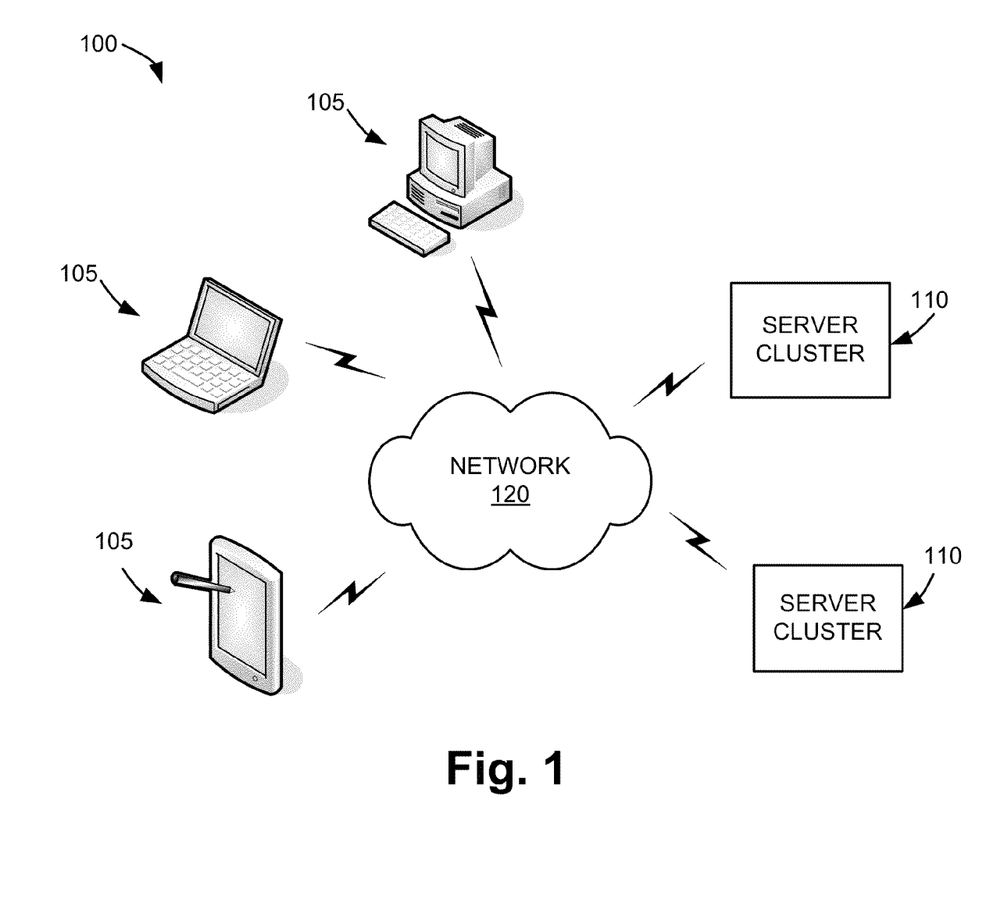
FIG. 1 is a diagram of an example environment in which systems and methods described herein may be implemented.

FIG. 1 is a diagram of an example environment 100 in which systems and methods described herein may be implemented. Environment 100 may include multiple clients 105 that can connect to one or more server clusters 110 via a network 120. Three clients 105 and two server clusters 110 are illustrated as connected to network 120 for simplicity. In practice, there may be more or fewer clients and server clusters.

Clients 105 may include a computing device, such as a personal computer, a wireless telephone, a personal digital assistant (PDA), smart phone, a laptop, a tablet computer, or another type of computation or communication device. Clients 105 may use services provided, through network 120, by server clusters 110. In one implementation, the services provided by server clusters 110 may be services in which a user of a client 105 may control or interact with the service, such as a web server that provides web pages that are directly viewable by users of clients 105. In another implementation, the services provided by server clusters 110 may be services designed to be used by other applications, such as business applications running on clients 105. In this case, the applications may access server clusters 110 using a protocol such as HTTP (hyper-text transfer protocol) to receive desired data and process the data. The applications may then provide the data, or an analysis of the data, to the user of client 105 using a custom presentation or display technique.

Server clusters 110 may each include one or more network devices, computing devices, and/or storage devices that collectively provide services to clients 105. In one implementation, server clusters 110 may include web servers. Although shown as a single block in FIG. 1, each server cluster 110 may be associated with a number of network devices, computing devices, and/or storage devices. In some implementations, a server cluster 110 may be geographically distributed. For instance, a large scale web server may include an East coast cluster of devices and a West coast cluster of devices. Clients 105 may be directed to the cluster that is geographically closest to the client 105.

Network 120 may include any type of network, such as a local area network (LAN), a wide area network (WAN), a telephone network (e.g., the Public Switched Telephone Network (PSTN) or a cellular network), an intranet, the Internet, or a combination of networks. Clients 105 and server clusters 110 may connect to network 120 via wired and/or wireless connections.

Although FIG. 1 illustrates exemplary components of example environment 100, in other implementations, environment 100 may include additional, fewer, different, or differently arranged components than those illustrated in FIG. 1 and described herein. Alternatively, or additionally, one or more of the components shown in FIG. 1 may perform functions described as being performed by other of the components shown in FIG. 1.

Figure 2:
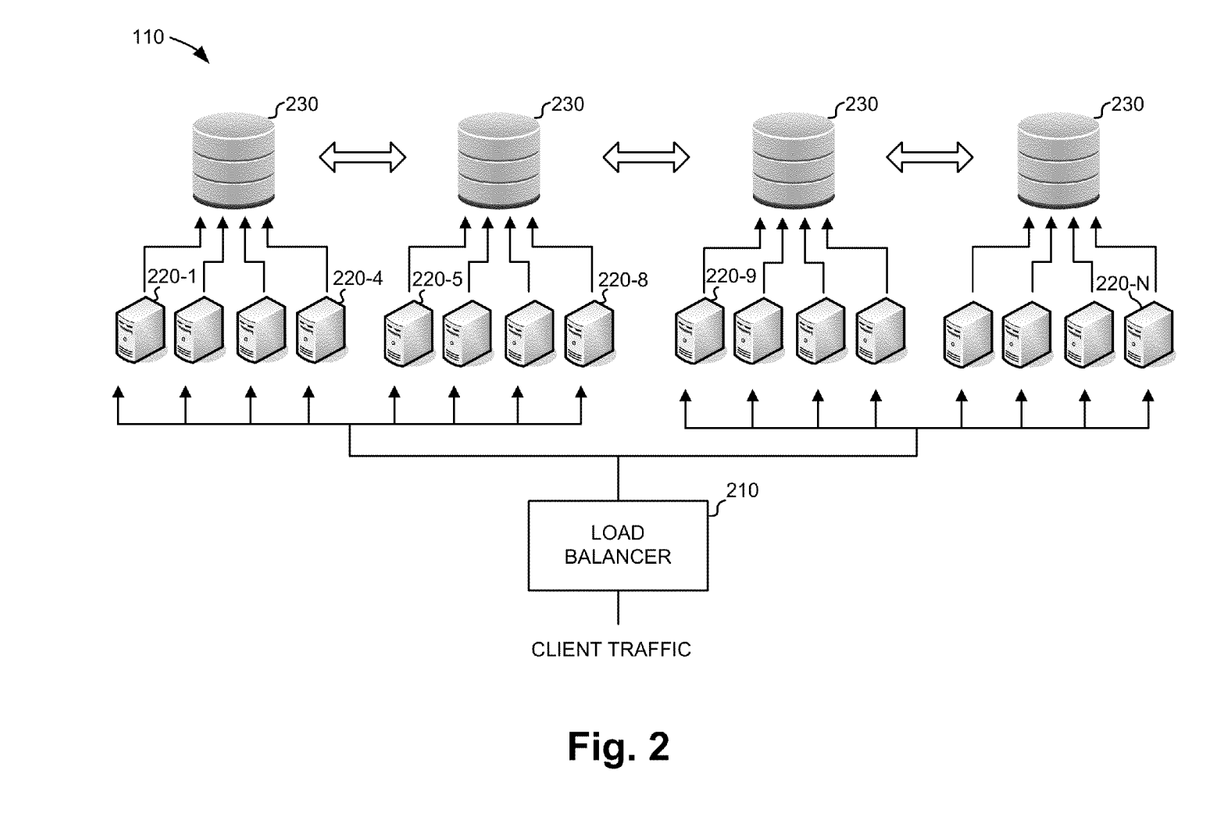
FIG. 2 is a diagram illustrating an example of one of the server clusters shown in FIG. 1.

FIG. 2 is a diagram illustrating an example of one of server clusters 110. As shown, a load balancer 210 may control the distribution of client traffic to servers 220-1 through 220-N (referred to herein collectively as "servers 220" or generically as "server 220") and database servers 230. In one implementation, servers 220 may include server computers, such as servers configured to handle web-based requests (e.g., HTTP requests) from clients 105. In the process of handling the requests from clients 105, servers 220 may access database servers 230.

Load balancer 210 may include a network device for balancing client requests among severs 220. Load balancer 210 may include for example, a general purpose server or a network device designed to implement load balancing functions. In some implementations, load balancer may be implemented as a hierarchy of load balancers. Load balancer 210 may receive "keep alive" messages from server 220, which servers 220 may periodically, such as every 10 seconds, send to load balancer 210. If one or more keep alive messages are not received from a server 220, as expected, load balancer 210 may assume the particular server is offline and may refrain from distributing client requests to this server.

In one implementation, servers 220 may include groups of geographically distributed servers. For example, servers 220-1 through 220-8 may be located at a facility on the West coast and servers 220-9 through 220-N may be located at a facility on the East coast. Load balancer 210 may route client requests to servers 220 based on the proximity of the client to the facilities associated with servers 220.

Database servers 230 may include relational databases, in which each database server 230 includes a number of tables. In one implementation, database servers 230 may each include, for example, a structure query language (SQL) server, such as the Microsoft SQL server. The data stored by each database server 230 may generally be identical. That is, database servers 230 may be replicated among one another (indicated in FIG. 2 by arrows between database servers 230) so that each database server 230 includes the same data. Logically, any one of database servers 230 may be capable of handling a request from any one of servers 220.

Although FIG. 2 illustrates exemplary components of a server cluster 110, in other implementations, server cluster 110 may include additional components, fewer components, different components, or differently arranged components than those illustrated in FIG. 2 and described herein. Alternatively, or additionally, one or more of the components shown in FIG. 2 may perform functions described as being performed by another of the components shown in FIG. 2.

Figure 3:
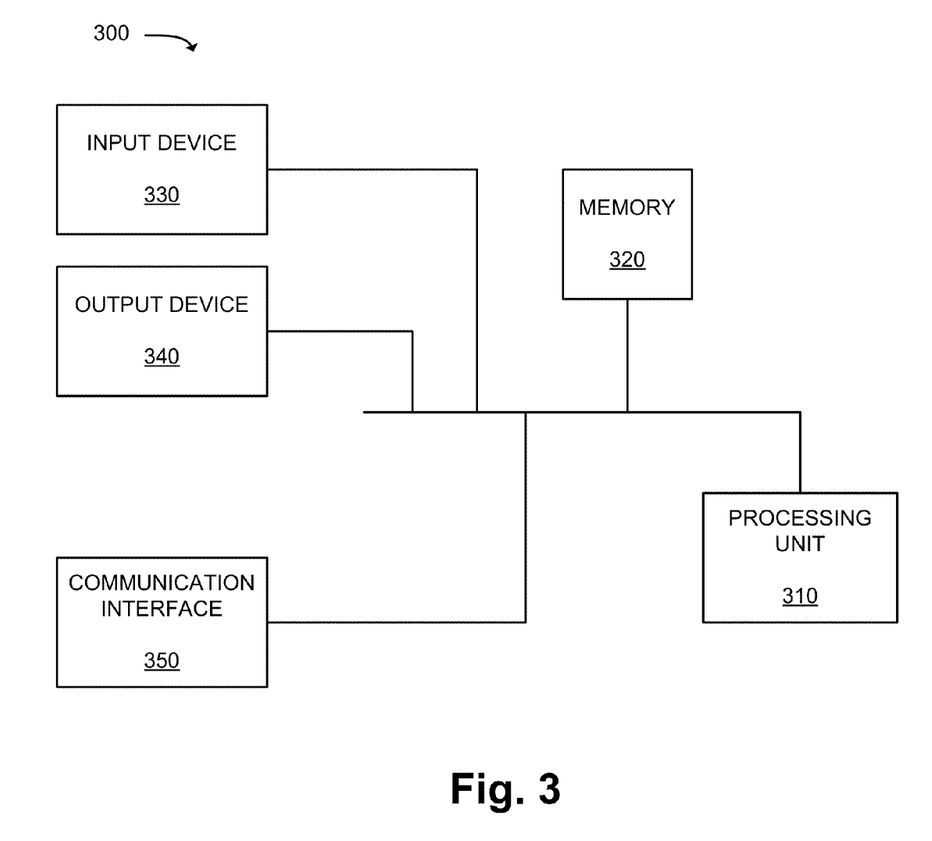
FIG. 3 is a diagram of example components of a device that may correspond to one of the devices of FIG. 1 and/or FIG. 2.

FIG. 3 is a diagram of example components of a device 300 that may correspond to one of the devices of environment 100 or server cluster 110. Device 300 may correspond to, for example, client 105, load balancer 210, a server 220, and/or a database server 230. As illustrated, device 300 may include a processing unit 310, a memory 320, an input device 330, an output device 340, and a communication interface 350.

Processing unit 310 may include one or more processors or microprocessors that interpret and execute instructions. In other implementations, processing unit 310 may be implemented as or include one or more application specific integrated circuits (ASICs), field programmable gate arrays (FPGAs), or the like.

Memory 320 may include a random access memory (RAM) or another type of dynamic storage device that stores information and instructions for execution by processing unit 310, a read only memory (ROM) or another type of static storage device that stores static information and instructions for the processing unit 310, and/or some other type of magnetic or optical recording medium and its corresponding drive for storing information and/or instructions.

Input device 330 may include a device that permits an operator to input information to device 300, such as a keyboard, a keypad, a mouse, a pen, a microphone, one or more biometric mechanisms, and the like. Output device 340 may include a device that outputs information to the operator, such as a display, a speaker, etc.

Communication interface 350 may include any transceiver-like mechanism that enables device 300 to communicate with other devices and/or systems. For example, communication interface 350 may include mechanisms for communicating with other devices, such as other devices of environment 100 and/or server cluster 110.

As described herein, device 300 may perform certain operations in response to processing unit 310 executing software instructions contained in a computer-readable medium, such as memory 320. A computer-readable medium may be defined as a non-transitory memory device. A memory device may include memory space within a single physical memory device or spread across multiple physical memory devices. The software instructions may be read into memory 320 from another computer-readable medium or from another device via communication interface 350. The software instructions contained in memory 320 may cause processing unit 310 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

As mentioned previously, database servers 230 may include relational databases. Each database server 230 may, for example, be configured to store information in a number of tables.

Figure 4A:
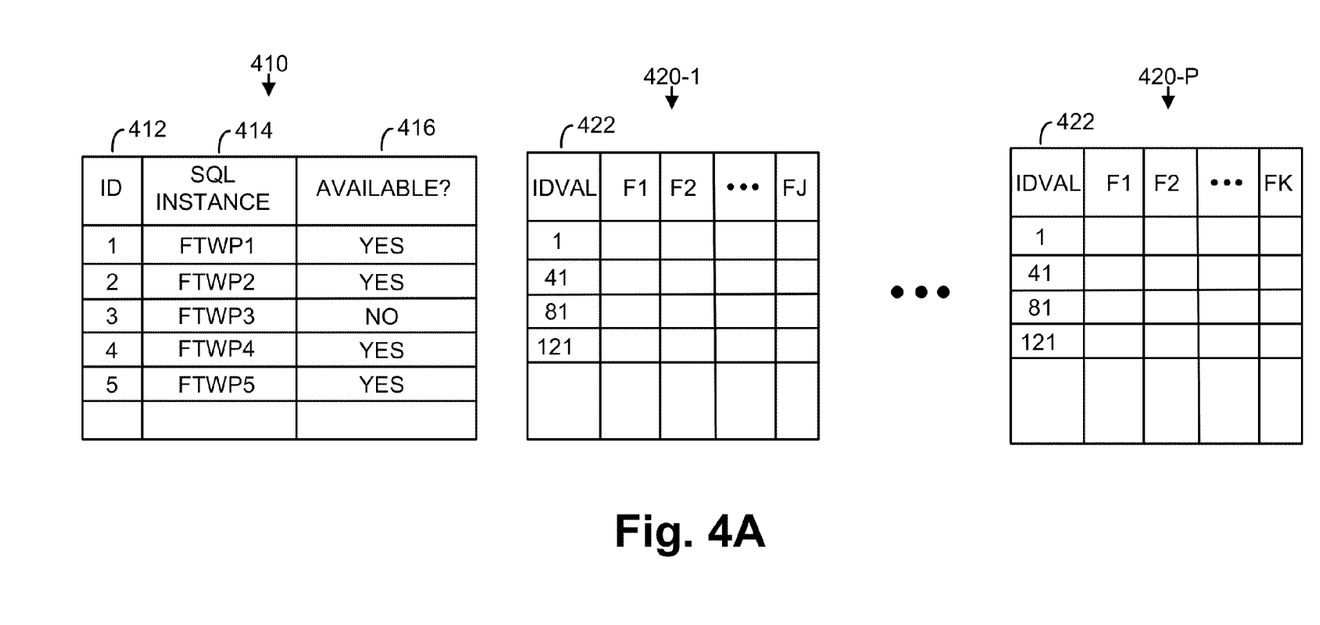
FIGS. 4A and 4B are diagrams illustrating an example of a set of tables maintained by the database servers shown in FIG. 2.

FIG. 4A is a diagram illustrating an example of a set of tables that may be maintained by one of database servers 230. The set of tables may include a control table 410 and one or more additional tables 420.

Control table 410 may be a table that indicates the availability of each database server 230. Control table 410 may be replicated and kept up-to-date at each of database servers 230. Control table may include an identifier (ID) field 412, an SQL instance field 414, and an available field 416. ID field 412 may store a unique (e.g., integer) value for each row in control table 410. SQL instance field 414 may store a string value identifying each instance of a database server 230. Available field 416 may indicate the current availability status of the corresponding database server instance. For example, as shown in FIG. 4A, the SQL database instance "FTWP1," which is associated with the ID value of 1, includes the value "YES" in available field 416, which may indicate that this database server instance is active and available. Database instance "FTWP3," however, includes the value "NO," which may indicate this database instance is not active. A "database instance," as used herein, may refer to one of database servers 230.

In addition to control table 410, each database server 230 may include a number of additional tables 420-1 through 420-P (referred to herein collectively as "tables 420" or generically as "table 420"). Each of tables 420 may include an identification value (IDVAL) field 422 and a number of additional fields, generically labeled as additional fields F. Table 420-1, for example, may include "J" additional fields F1, F2 though FJ, and table 420-P may include "K" additional fields F1, F2 through FK. As an example of two additional tables 420 (i.e., P equals two), assume that a first one of the tables includes the fields: IDVAL, "employee name", and "employee number." This table, in addition to storing identification values in IDVAL field 422, may store employee names and corresponding employee numbers. The second one of the tables may include the fields: IDVAL, "monthly sales", and "employee number." This table, in addition to storing identification values in IDVAL field 422, may store employee numbers and corresponding sales figures (e.g., monthly sales totals) relating to each of the employees. These two tables may be relational in that the employee number field may relate employee names in the first table to monthly employee sales in the second table.

IDVAL field 422 may be stored in each additional table 420. Within an additional table 420, every value in the IDVAL fields 422 may be unique. In other words, within a table, IDVAL field 422 may be a unique key into that table. In one implementation, the IDVAL fields 422 within an additional table 422 may be assigned based on a predetermined increment value. In FIG. 4A, the increment value is illustrated as 40. Thus, the first IDVAL field 422 may have a value of 1, the second may have a value of 41, the third may have a value of 81, etc. In the notation of Microsoft SQL server, this IDVAL field can be assigned as: idval bigint identity (initValue, incValue), which assigns the field named "idval" as holding "bigint" types, where the first created record is assigned the value initValue (e.g., 1) and each subsequently added record is assigned a value that is determined by incrementing the IDVAL of the previously added record by IncValue (e.g., 40).

The initial value, initValue, may be assigned for each database server 230 as a value that is different for each database server 230. The value to increment IDVAL field 422, incValue, may be determined as a value that is greater than the total number of database servers 230 and may be identical for each database server 230. In this manner, IDVAL field 422 may function as both a unique key within each additional table 420 and as an identifier for a particular database server 230. In FIG. 4A, for example, the particular database server 230 corresponding to additional tables 420 may be the database server having the ID value of "1" stored in ID field 412 (the SQL instance corresponding to the first record in control table 412), which may be obtained by performing the modulo operation (i.e., calculating the remainder) of the value in the IDVAL field 422 and incValue. Thus, for FIG. 4A, the remainder of any value in IDVAL field 422 divided by incValue (40) equals 1, which may be the identifier for that particular database server.

Figure 4B:
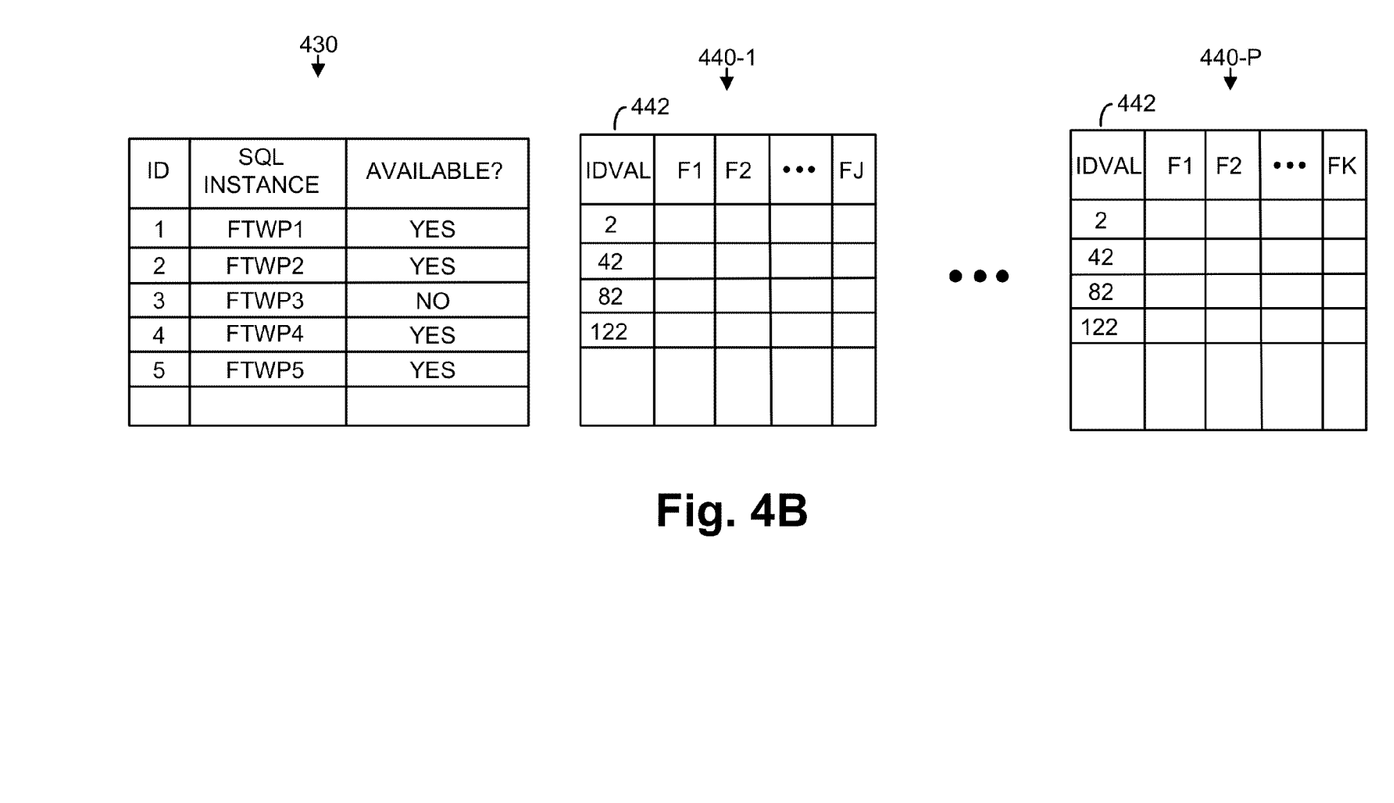

FIG. 4B is a diagram illustrating an example of a set of tables maintained by another one of database servers 230. The tables shown in FIG. 4B may include control table 430 and additional tables 440-1 through 440-P. As previously, mentioned, the substantive content of each of database servers 230 may generally be replicated over all of database servers 230. Accordingly, control table 430 may contain the same data as control table 410 and additional tables 440-1 through 440-P may contain the same substantive data as additional tables 420-1 through 420-P.

In FIG. 4B, however, assume that the database server 230 has an ID value of "2," and may thus correspond to the second record in control table 430. IDVAL field 442 may include different values than IDVAL field 422 for the database server shown in FIG. 4A. In particular, as shown, with initValue equal to 2 and incValue equal to 40, the first IDVAL field 442 may have a value of 2, the second may have a value of 42, the third may have a value of 82, etc. Thus, for this database server, any IDVAL, from IDVAL field 442, modulo 40, will equal 2.

The tables, and the fields within each table, as shown in FIGS. 4A and 4B, are examples. In an alternative implementation, a database server 230 may include additional or fewer tables, or additional or fewer fields within a table.

Figure 5:
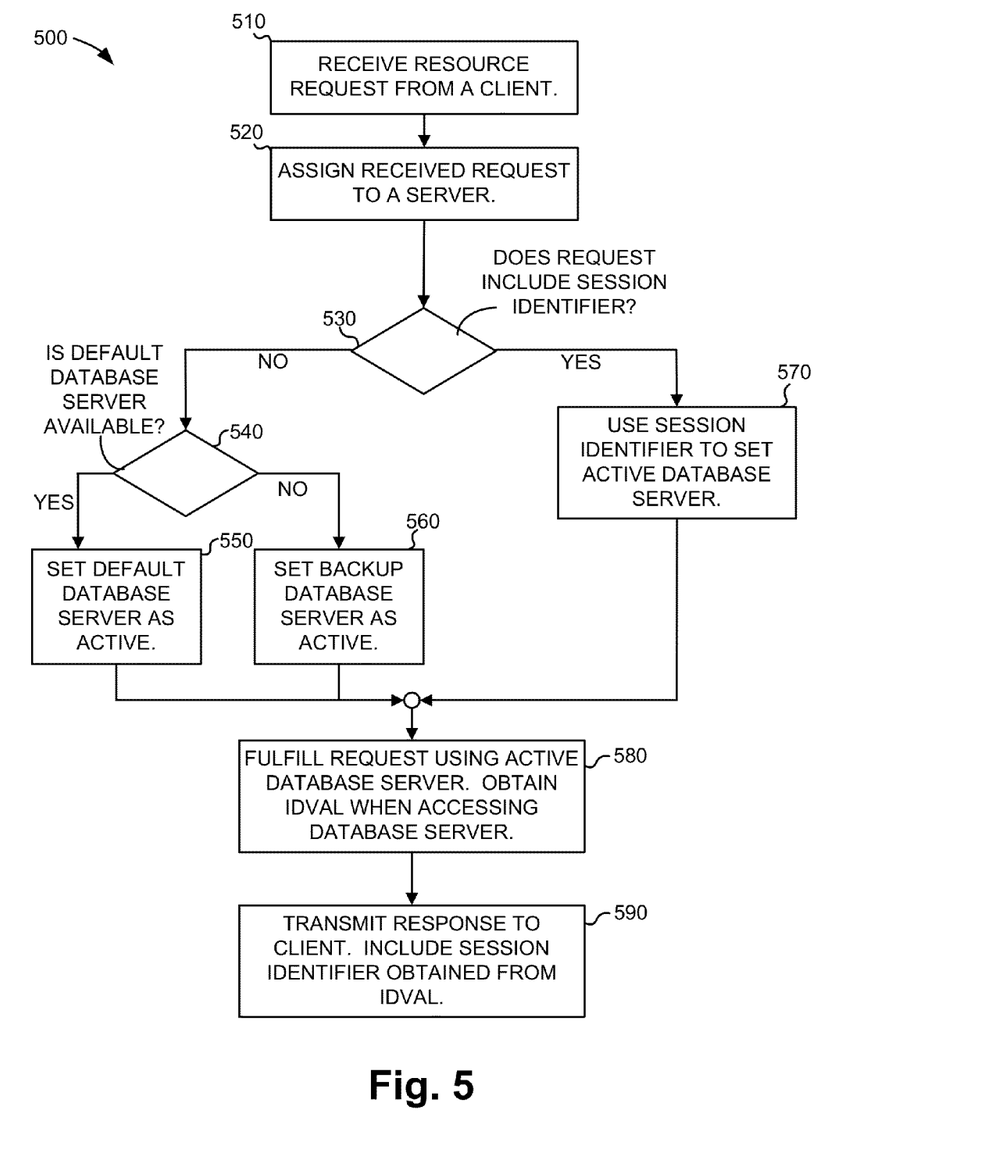
FIG. 5 is a flow chart illustrating an example of a process for processing client requests in a server cluster.

FIG. 5 is a flow chart illustrating an example of a process 500 for processing client requests to server cluster 110. In general, an incoming client request may be routed to one of servers 220 by load balancer 210. The server 220 that receives the request may then determine which database server 230 to use in fulfilling the request.

Servers 220 may be initially configured, such as by an administrator, to include a reference to a primary database server 230 and a backup database server 230. In the example arrangement shown in FIG. 2, servers 220, for instance, may be arranged into a first group, including servers 220-1 through 220-4, and a second group, including servers 220-5 through 220-8. The servers in the first group may be configured to include the first database server 230 as the primary database server and the second database server 230 as the backup database server. In one implementation, this information may be installed as a configuration file.

Table I, below, illustrates an example configuration file that may be installed on the first group (servers 220-1 through 220-4) and the second group (servers 220-5 through 220-8). In Table I, assume that the Internet Protocol (IP) address of the first database server 230 is 113.128.221.213 and the IP address of the second database server 230 is 113.128.221.214. The primary database server in Table I is given the name "PreferredServer" and "Server1" and the backup database server is given the name "Server2." Servers 220-1 through 220-8 may read the configuration information shown in Table I to associate database connection information with textual server names ("PreferredServer," "Server1," "Server2").

TABLE I

SERVER GROUP 1 (SERVERS 220-1 THROUGH 220-4):

<add name="PreferredServer" providerName= "System.Data.SqlClient" connectionString ="server=113.128.221.213, database=db1, uid=test, password=pass;"/>
<add name="Server1" providerName= "System.Data.SqlClient" connectionString ="server=113.128.221.213, database=db1, uid=test, password=pass;"/>
<add name="Server2" providerName= "System.Data.SqlClient" connectionString ="server=113.128.221.214, database=db1, uid=test, password=pass;"/>

SERVER GROUP 2 (SERVERS 220-5 THROUGH 220-8):

<add name="PreferredServer" providerName= "System.Data.SqlClient" connectionString ="server=113.128.221.214, database=db1, uid=test, password=pass;"/>
<add name="Server1" providerName= "System.Data.SqlClient" connectionString ="server=113.128.221.214, database=db1, uid=test, password=pass;"/>
<add name="Server2" providerName= "System.Data.SqlClient" connectionString ="server=113.128.221.213, database=db1, uid=test, password=pass;"/>

Referring to FIG. 5, process 500 may include receiving a resource request from one of clients 105 (block 510). The request from client 105 may include a request relating to a stateless data request, a request for a session initiation, or other traffic relating to a service/data request that should be assigned to one of servers 220. In one implementation, the request may be an HTTP request and may be associated with a uniform resource identifier (URI), which may be a string of characters used to identify a resource.

Process 500 may further include assigning the received request to one of servers 220 (block 520). The request may be assigned to a particular one of servers 220 by load balancer 210. Load balancer 210 may assign the received request based on geographical proximity of a client 105 to a server 220 and/or based on techniques used to ensure that servers 220 are generally equally loaded. For example, if servers 220 are located in different geographic locations, load balancer 210 may first assign a connecting client 105 based on proximity to servers 220 and then based on a hashing technique, such as the consistent hashing technique, designed to fairly distribute load within a group of servers. The assignment of clients 105 to servers 220 may be performed so that multiple requests from the same client may tend to be assigned to the same server 220. In some situations, after an initial request is assigned to a server, subsequent communications between the client and server within a session may be directly routed without going through load balancer 210.

Process 500 may further include, at the assigned server 220, determining whether the received request includes a session identifier (block 530). A session identifier, which may also be referred to as a session token, may be data that is used to identify a series of related requests from a client 105. In one implementation, servers 220, that are responding to a client 105, may embed a session identifier assigned to the client in URIs returned to the client. Subsequent requests from the client may then include the session identifier in the URI requested by the client. In alternative possible implementations, session identifiers may be transmitted to a client 105 as part of an HTTP cookie. The client may then return a cookie, including the session identifier, in subsequent communications. Other techniques for associating a client with a session identifier may alternatively be used.

If a session identifier is not received as part of a session request, (block 530—NO), server 220 may determine the database server 230 to use when fulfilling the client request (blocks 540-560). Server 220 may determine, such as based on the state information obtained from control table 410, whether the default database server is available (block 540). For the configuration files shown in Table I, the default database server 230 may be the database server that is assigned the name "PreferredServer." When the default database server 230 is available, (block 540—YES), server 220 may set the default database server 230 as the active database server for the client (block 550). Server 220 may, for instance, use the connection string, shown in Table I for the preferred server, to connect to one of database servers 230. When, however, the default database server 230 is not available, (block 540—NO), server 220 may set the backup database server 230 as the active database server for the client (block 560). Server 220 may, for instance, use the connection string, shown in Table I for the server database labeled as "Server2", to connect to one of database servers 230.

Referring back to block 530, if the session identifier is received as part of the resource request, (block 530—YES), server 220 may use the session identifier to determine which database server 230 to use as the active database server for the client (block 570). In one implementation, the session identifier may be extracted and the modulo operation may be performed on the session identifier (or a predetermined portion of the session identifier corresponding to the database server) to obtain a numeric value corresponding to the database server that is to be used, such as the value in ID value field 412. In an alternative implementation, the session identifier may have been previously set after application of the modulo operation, in which case the session identifier may directly correspond to the database server.

Table II, below, illustrates pseudo-code that may be used to implement block 570. As illustrated, the variable "SessionID" is converted, via a modulo operation (% 40) to a value, stored in the variable "ServerID," that identifies a database server 230. The "ServerID" variable may then be used as a selector to choose the code to create a connection to the selected database server 230.

TABLE II

```
int ServerID = Convert.ToInt32(SessionID) % 40;
switch (ServerID)
{
    case 1:
        objDatabase = DatabaseFactory.CreateDatabase("Server1");
        break;
    case 2:
        objDatabase = DatabaseFactory.CreateDatabase("Server2");
        break;
    default:
        objDatabase =
        DatabaseFactory.CreateDatabase("PreferredServer");
        break;
}
```

Process 500 may further include fulfilling the client's request using the active database server (block 580). The request may include, for instance, an HTTP request that requires server 220 to access the active database server 230, such as one of tables 420/440 in the active database server. Server 220 may parse the request and generate a response, such as an HTML document. The response may be generated, at least in part, on data obtained from database server 230, such as by querying one or more tables 420/440 in database server 230. In addition to accessing the substantive fields in tables 420/440, server 220 may also, when querying database server 230, obtain an IDVAL for one or more accessed records (block 580). Because IDVAL field 422 may be included in each record of tables 420/440, requesting the IDVAL from IDVAL field 422 may be a relatively efficient operation that does not require a separate request to the active database server.

Process 500 may further include transmitting the generated response to the client (block 590). The response may include a session identifier that is based on the obtained IDVAL (block 590). For example, when the response is an HTML document, links in the document may be generated so that each link includes IDVAL as a session identifier. In this manner, when the client requests a link from the HTML document, the request will include the embedded session identifier. In other implementations, other techniques for transmitting the session identifier to the client may be used. For example, the session identifier may be transmitted as a cookie that is returned as part of subsequent requests from the client. In one implementation, in situations in which a session identifier has already been determined for a session (i.e., block 530 is YES), the same session identifier may continue to be used when transmitting additional responses to the client in block 590.

While a series of blocks has been described with regard to FIG. 5, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device-implemented method comprising:
receiving, by the device, a resource request from a client;
determining, by the device, whether the resource request includes a session identifier,
extracting, by the device, in response to the determining that the resource request includes the session identifier, a session identifier from the resource request;
determining, by the device and based on the session identifier, a database server, of a plurality of database servers, to use in fulfilling the resource request, wherein the determining comprises:
identifying, by device and based on the session identifier, the database server based on at least one of a proximity of the database server to the client or a load balancing function associated with the plurality of database servers;
generating, by the device, a response to the resource request based on data received from one or more tables of the determined database server, the data including at least a value relating to the session identifier; and
transmitting, by the device, the response to the client, the response including the value, where the value is returned by the client at least as part of the session identifier for subsequent resource requests.

2. The method of claim 1, wherein the identifying further comprises performing a modulo operation on the extracted session identifier to identify the database server.

3. The method of claim 1, further comprising:
determining, when no session identifier is present in the resource request, the database server to use to fulfill the resource request based on one or more pre-configured database servers specified for the device.

4. The method of claim 3, where determining the database server to use to fulfill the resource request includes using a pre-configured preferred database server when the preferred database server is available and using a pre-configured backup database server when the preferred database server is not available.

5. The method of claim 3, where determining the database server to use to fulfill the resource request includes accessing a control table, in one of the database servers, that stores availability information relating to the database servers.

6. The method of claim 3, where the control table is replicated over all of the plurality of database servers.

7. The method of claim 1, where data in the plurality of database servers is replicated throughout the plurality of database servers.

8. The method of claim 1, where generating the response to the resource request includes:
querying the one or more tables of the determined database server, where each record of each of the one or more tables of the determined database server includes a different value relating to the session identifier.

9. The method of claim 1, where extracting the session identifier from the resource request includes extracting the session identifier from a uniform resource identifier (URI) associated with the resource request or receiving the session identifier as a cookie.

10. A non-transitory computer-readable medium that stores programming instructions for execution by one or more processors, the programming instructions including:
instructions to receive a resource request from a client;
instructions to determine whether the resource request includes a session identifier,
instructions to extract, in response to determining that the resource request includes the session identifier, a session identifier from the resource request;
instructions to determine, based on the session identifier, a database server, of a plurality of database servers, to use in fulfilling the resource request, wherein the instructions to determine a database server comprise:
instructions to identify, the database server of the plurality of database servers, by performing a modulo operation on the session identifier;
instructions to generate a response to the resource request based on data received from one or more tables of the determined database server, the data including at least a value relating to the session identifier; and
instructions to transmit the response to the client, the response including the value, where the value is returned by the client at least as part of the session identifier for subsequent resource requests.

11. The non-transitory computer-readable medium of claim 10, wherein the instructions to determine the database server further comprise:
instructions to identify, the database server of the plurality of servers, based on at least one of a proximity of the database server to the client or a load balancing function associated with the plurality of database servers.

12. The non-transitory computer-readable medium of claim 10, further comprising:
instructions to determine, when no session identifier is present in the resource request, the database server to use to fulfill the resource request based one or more pre-configured database servers specified for the device.

13. The non-transitory computer-readable medium of claim 10, where data in the plurality of database servers is replicated throughout the plurality of database servers.

14. The non-transitory computer-readable medium of claim 10, wherein the instructions to generate the response to the resource request further include:
instructions to query the one or more tables of the determined database server, where each record of each of the one or more tables of the determined database server includes a different value relating to the session identifier.

15. The non-transitory computer-readable medium of claim 10, where the instructions to extract the session identifier from the resource request further includes:
instructions to extract the session identifier from a uniform resource identifier (URI) associated with the resource request; or
instructions to receive the session identifier as a cookie.

16. A system comprising:
a plurality of database servers, each of the plurality of database servers including a control table to store availability information relating to the plurality of database servers; and
a plurality of web servers, coupled to the plurality of database servers, to access one of the plurality of database servers as a preferred database server and another one of the plurality of database servers as a backup database server, the plurality of web servers each to:
receive a resource request from a client;
determine an active database server of the plurality of database servers, to use in fulfilling the resource request, the active database server being determined based on a value obtained from a modulo operation performed on a predetermined portion of a session identifier included with the resource request, or, when no session identifier is included with the resource request, the active database server being determined based on the availability information;

generate a response to the resource request based on data received from the active database server, the data including at least the value; and transmit the response to the client.

17. The system of claim 16, where the plurality of web servers are further to:

transmit the response to the client as a response that includes the value as the session identifier for the response.

18. The system of claim 16, further comprising:

a load balancer to distribute resource requests, received from a plurality of clients, to the plurality of web servers.

19. The system of claim 16, where the plurality of web servers include a first group of the plurality of web servers, located in a first geographic region, and a second group of the plurality of web servers, located in a second, different, geographic region.

20. The system of claim 16, where the control table is replicated over all of the plurality of database servers and where data in the plurality of database servers is replicated throughout the database servers.

21. The system of claim 16, where the plurality of web servers are further to:

query records of the active database server, where each record of a table of the active database server includes a different value relating to the session identifier.

* * * * *